United States Patent
Cheng et al.

(10) Patent No.: US 10,474,490 B2
(45) Date of Patent: Nov. 12, 2019

(54) EARLY VIRTUALIZATION CONTEXT SWITCH FOR VIRTUALIZED ACCELERATED PROCESSING DEVICE

(71) Applicants: Advanced Micro Devices, Inc., Sunnyvale, CA (US); ATI Technologies ULC, Markham (CA)

(72) Inventors: Gongxian Jeffrey Cheng, Markham (CA); Louis Regniere, Orlando, FL (US); Anthony Asaro, Markham (CA)

(73) Assignees: Advanced Micro Devices, Inc., Sunnyvale, CA (US); ATI TECHNOLOGIES ULC, Markham, Ontario (CA)

( * ) Notice: Subject to any disclaimer, the term of this patent is extended or adjusted under 35 U.S.C. 154(b) by 113 days.

(21) Appl. No.: 15/637,800

(22) Filed: Jun. 29, 2017

(65) Prior Publication Data
US 2019/0004839 A1 Jan. 3, 2019

(51) Int. Cl.
*G06F 9/50* (2006.01)
*G06F 9/46* (2006.01)
*G06F 9/455* (2018.01)

(52) U.S. Cl.
CPC ......... *G06F 9/45558* (2013.01); *G06F 9/461* (2013.01); *G06F 9/50* (2013.01); *G06F 9/45533* (2013.01); *G06F 2009/45575* (2013.01)

(58) Field of Classification Search
None
See application file for complete search history.

(56) References Cited

U.S. PATENT DOCUMENTS

| | | | | |
|---|---|---|---|---|
| 9,411,630 | B1* | 8/2016 | Adams | G06F 9/45558 |
| 9,639,401 | B1* | 5/2017 | Bertram | G06F 9/4887 |
| 2011/0099551 | A1* | 4/2011 | Fahrig | G06F 9/5038 |
| | | | | 718/102 |
| 2012/0147021 | A1* | 6/2012 | Cheng | G06F 9/545 |
| | | | | 345/522 |
| 2012/0200576 | A1* | 8/2012 | Hartog | G06F 9/4881 |
| | | | | 345/501 |
| 2012/0229481 | A1* | 9/2012 | McCrary | G06F 9/5044 |
| | | | | 345/522 |
| 2013/0174144 | A1* | 7/2013 | Cheng | G06F 9/45558 |
| | | | | 718/1 |

(Continued)

*Primary Examiner* — Isaac T Tecklu
(74) *Attorney, Agent, or Firm* — Volpe and Koenig, P.C.

(57) ABSTRACT

A technique for efficient time-division of resources in a virtualized accelerated processing device ("APD") is provided. In a virtualization scheme implemented on the APD, different virtual machines are assigned different "time-slices" in which to use the APD. When a time-slice expires, the APD performs a virtualization context switch by stopping operations for a current virtual machine ("VM") and starting operations for another VM. Typically, each VM is assigned a fixed length of time, after which a virtualization context switch is performed. This fixed length of time can lead to inefficiencies. Therefore, in some situations, in response to a VM having no more work to perform on the APD and the APD being idle, a virtualization context switch is performed "early." This virtualization context switch is "early" in the sense that the virtualization context switch is performed before the fixed length of time for the time-slice expires.

20 Claims, 5 Drawing Sheets

(56) References Cited

U.S. PATENT DOCUMENTS

| | | | | |
|---|---|---|---|---|
| 2014/0157287 A1* | 6/2014 | Howes | ............... | G06F 9/461 |
| | | | | 718/108 |
| 2015/0220367 A1* | 8/2015 | Hotra | ............... | G06F 9/5038 |
| | | | | 718/1 |
| 2015/0277763 A1* | 10/2015 | Zhou | ............... | G06F 9/45558 |
| | | | | 711/105 |
| 2015/0378782 A1* | 12/2015 | Hks | ............... | G06F 9/4887 |
| | | | | 718/103 |
| 2017/0069054 A1* | 3/2017 | Ramadoss | ............... | G06T 1/20 |
| 2018/0349165 A1* | 12/2018 | Asaro | ............... | G06F 9/45558 |

\* cited by examiner

EARLY VIRTUALIZATION CONTEXT SWITCH FOR VIRTUALIZED ACCELERATED PROCESSING DEVICE

BACKGROUND

Computer virtualization is a technique in which a single set of hardware is shared among different virtual instances of a computer system. Each instance—a virtual machine ("VM")—believes that it owns a whole, hardware computer system, but in reality, the hardware resources of a computer system are shared among the different VMs. Advances in virtualization, including advances in virtualization for devices other than the CPU, system memory, and the like, are constantly being made.

BRIEF DESCRIPTION OF THE DRAWINGS

A more detailed understanding can be had from the following description, given by way of example in conjunction with the accompanying drawings wherein.

DETAILED DESCRIPTION

A technique for efficient time-division of resources in a virtualized accelerated processing device ("APD") is provided. In a virtualization scheme implemented on the APD, different virtual machines are assigned different "time-slices" in which to use the APD. When a time-slice expires, the APD performs a virtualization context switch by stopping operations for a current virtual machine ("VM") and starting operations for another VM. Different time-slices are associated with different functions (e.g., virtual functions—a peripheral component interconnect express ("PCIe") addressing parameter).

Typically, each VM is assigned a fixed length of time, after which a virtualization context switch is performed. This fixed length of time can lead to inefficiencies. For example, in some situations, a VM has no more work to perform and is idle but some time still remains in the current time-slice for that VM. Therefore, in some situations, in response to a VM having no more work to perform on the APD and the APD being idle, a virtualization context switch is performed "early." This virtualization context switch is "early" in the sense that the virtualization context switch is performed before the fixed length of time for the time-slice expires.

In some implementations, the APD waits for a timeout period after detecting that the APD is idle and that there is no more work to perform before performing the early virtualization context switch. If additional work is received during that timeout period and there is sufficient time remaining in the current time-slice, then an early virtualization context switch is not performed. Instead, the APD is permitted to fetch the new work and perform that work. If no additional work is received during that timeout period, then an early virtualization context switch is performed.

In some implementations, after an early virtualization context switch has been performed for a function, the APD does not re-schedule that function on the APD if no work has been received since the early virtualization context switch was performed. In some examples, a doorbell mechanism is implemented whereby when a memory mapped "doorbell" address is written to, the APD is notified that work is ready for a particular function. Different doorbells (and thus different doorbell addresses) are associated with different virtual functions. Thus if no doorbells for a particular function are received after an early virtualization context switch has occurred for that function, then the APD does not execute work for that function the next time a "turn" occurs in the virtualization time-slicing scheme for the APD.

Figure 1:
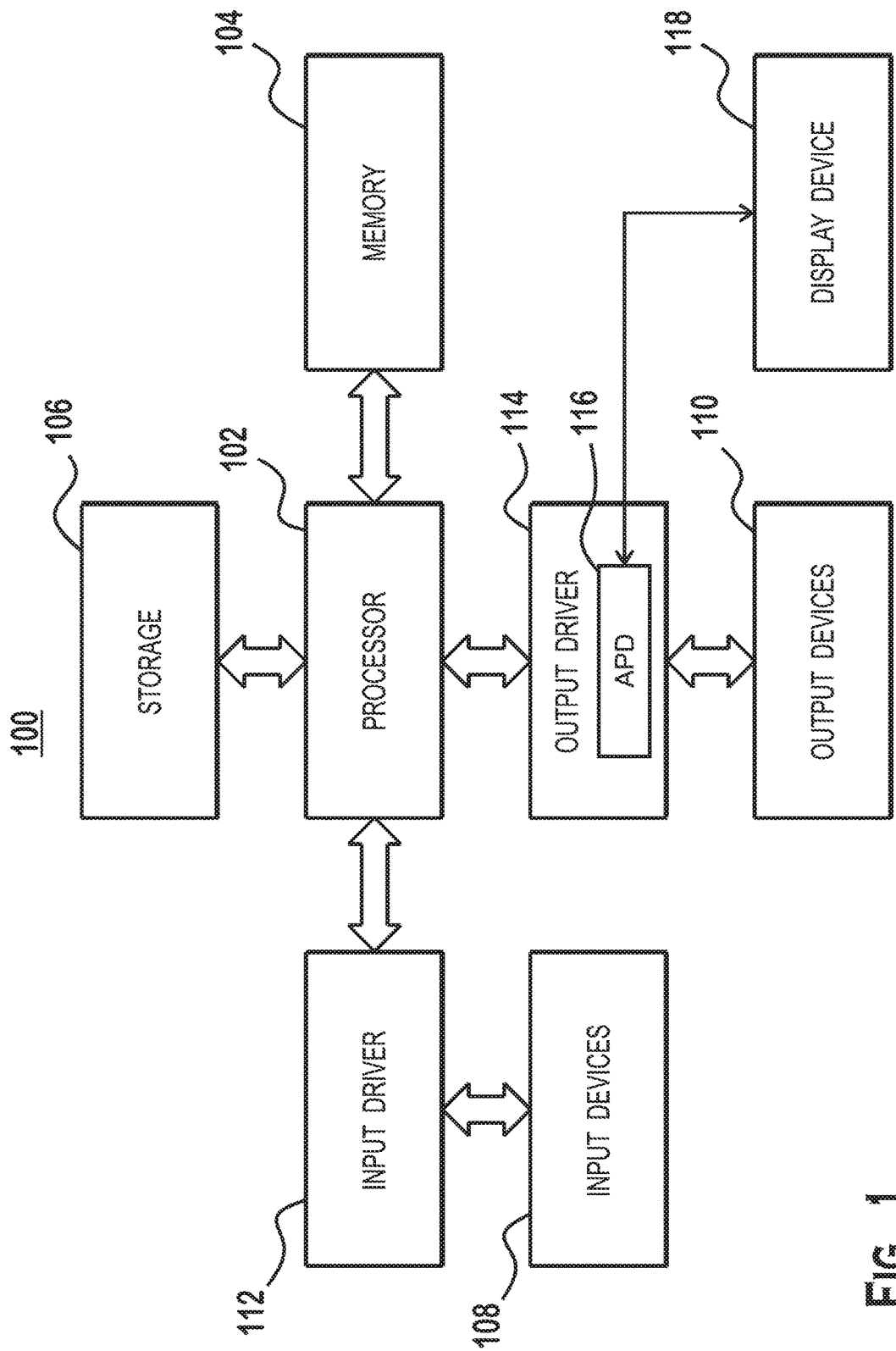
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102 (which may also be referred to as a "host processor"), a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

The processor 102 is configured to support a virtualizations scheme in which multiple virtual machines execute on the processor 102. Each virtual machine ("VM") "appears" to software executing in that VM as a completely "real" hardware computer system, but in reality comprises a virtualized computing environment that may be sharing the device 100 with other virtual machines. Virtualization may be supported fully in software, partially in hardware and partially in software, or fully in hardware. The APD 116 supports virtualization, meaning that the APD 116 can be shared among multiple virtual machines executing on the processor 102, with each VM "believing" that the VM has full ownership of a real hardware APD 116.

Figure 2:
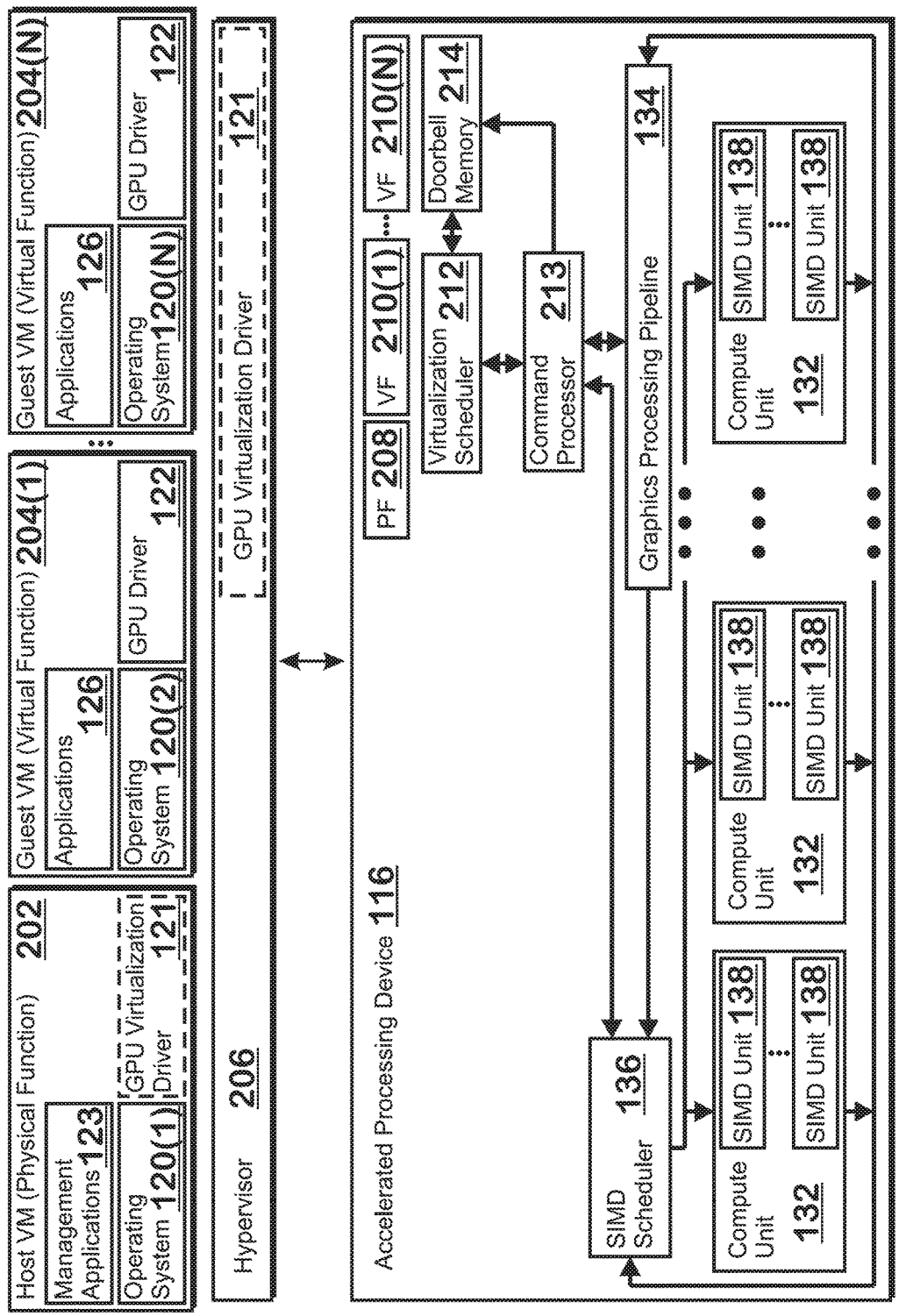
FIG. 2 illustrates details of the device and the accelerated processing device related to virtualization, according to an example.

FIG. 2 illustrates details of the device 100 and the APD 116 related to virtualization, according to an example. The processor 102 supports multiple virtual machines. A specialized host virtual machine 202, is not a "general purpose" VM like the guest VMs 204, but instead performs support for virtualization of the APD 116 for use by the guest VMs 204. A hypervisor 206 provides virtualization support for the virtual machines, which includes a wide variety of functions such as managing resources assigned to the virtual machines, spawning and killing virtual machines, handling system calls, managing access to peripheral devices, managing memory and page tables, and various other functions.

The APD 116 supports virtualization by allowing time-based sharing of the APD 116 between the virtual machines. On the APD 116, the host VM 202 is mapped to a physical function 208 and guest VMs 204 are mapped to virtual functions 210. "Physical functions" are essentially an addressing parameter in the peripheral component interconnect express ("PCIe") standard. More specifically, physical functions allow communications involving a device coupled to a PCIe interconnect fabric to specify a particular physical function of the device so that the device is able to handle the communications according to functionality specifically assigned to that physical function. In one example, a physical function is associated with regular graphics rendering on a graphics processing device such as the APD 116. Herein, a single physical function is described, but the teachings of the present disclosure apply to APDs 116 for which more than one physical function is active.

Virtual functions are a feature of the PCIe standard that facilitates hardware virtualization and also act as an addressing parameter in the PCIe standard. Typically, a set of virtual functions is associated with a particular physical function. Each virtual machine is assigned a different virtual function, with the hypervisor 206 managing the correlation between VMs and virtual functions. This correlation between virtual functions and virtual machines 202 is mostly true in the system of FIG. 2, except that the host VM 202 is able to access the physical function 208 as well as any of the different virtual functions 210. In that sense, the host VM 202 acts as a sort of "master virtual machine" for APD virtualization. In some systems, the host VM 202 is not present, with the functions of the host VM 202 described herein performed by the hypervisor 206 instead (which is why the GPU virtualization driver 121 is illustrated in dotted lines in the hypervisor 206). Note that although it is sometimes described herein that virtual functions are associated with virtual machines, it is also possible for the physical function to be associated with one or more virtual machines. Typically, the host VM 202 is considered to be "associated" with the physical function, and guest VMs 204 being associated with virtual functions. Because it is possible for virtual and physical functions to operate in a similar manner in some contexts, the term "function" within the specifier "virtual" or "physical" refers either to virtual functions or physical functions or to both virtual functions and physical functions collectively. For example, in some instances, it might be stated that the APD 116 time-shares operations between functions, which means that the APD 116 is time-shared among different virtual functions and, if actively participating in time-sharing on the APD 116, a physical function. It is not necessary for the physical function to participate in this time sharing, but it is possible for such the physical function to participate.

As described above, physical functions and virtual functions are addressing parameters in PCIe. Transactions over PCIe thus are associated with a physical function and optionally, additionally, a virtual function. Addressing over PCIe may be made explicitly, via a bus-device-function number paradigm, but this addressing paradigm is usually reserved for device configuration (e.g., PCIe device enumeration) or for other situations. More typically, and in standard operation, transactions over PCIe are made by memory address, with the PCIe fabric routing the transaction to an appropriate device and physical function and/or virtual function, based on a memory map. In this scenario, a VM would make an access to a memory address and the hypervisor or translation layer would translate the provided memory address, which is in guest physical memory address space, to an address in the system physical memory address space that is mapped to the APD 116. This translated address does not explicitly include an indication of a virtual function but is mapped to a particular virtual function via a memory map and is routed to that virtual function by the routing functionality of the PCIe fabric. Transactions over PCIe made via memory mapped addresses do not explicitly specify virtual or physical function numbers.

The present disclosure includes mention of guest and system physical address spaces. The relationship between these address spaces is now described. A system physical address space is the "true" physical address space of the device 100. The hypervisor 206 is able to access this address space, but this address space is hidden from VMs. A guest physical address space is the virtualized "physical" address space as "seen" by a particular guest VM 204. In other words, to a guest VM 204, a guest physical address space appears to be the actual physical address space. A third address space—guest virtual memory—represents the typical virtual memory address space that would exist in computer systems, but that exists in the virtualized environment of a VM. Mappings between the system physical address space and the guest physical address space are managed by the hypervisor 206 and mappings between the guest virtual address space and the guest physical address space are managed by the operating systems 120 although other parts of the device 100 (such as hardware-based page table walkers, translation caches, or other elements) may be involved in managing mappings between the different address spaces.

Sharing the APD 116 among the different virtual machines is accomplished by time-dividing the operations of the APD 116 among the different virtual machines, with different virtual functions (or the physical function) assigned to different virtual machines. A virtualization scheduler 212 performs work related to time-sharing the APD 116, scheduling a new virtual machine for operation by switching from work for a current virtual machine as the execution time assigned to that virtual machine elapses. Although the APD 116 is shared among the different virtual machines, each virtual machine perceives that it has an individual instance of a real, hardware APD 116.

Although the terms "virtual function" and "physical function" refer to addressing parameters of the PCIe standard, because these functions map to different VMs, the logical instance of an APD 116 assigned to a particular virtual machine will also be referred to herein as either a virtual function or a physical function. In other words, this disclosure may use terminology such as "the virtual function performs a task," (or physical function) or "an operation is performed on or for a virtual function," (or physical function) and this terminology should be read to mean that the APD 116 performs that task for the time-slice assigned to the VM associated with that particular virtual or physical function, or on behalf of the VM associated with that virtual or physical function.

The host VM 202 and the guest VMs 204 have operating systems 120. The host VM 202 has management applications 123 and a GPU virtualization driver 121. The guest VMs 204 have applications 126, an operating system 120, and a GPU driver 122. These elements control various features of the operation of the processor 102 and the APD 116.

As stated above, the host VM 202 configures aspects of virtualization in the APD 116 for the guest VMs 204. Thus the host VM 202 includes an operating system 120 that supports execution of other elements such as management applications 123 and a GPU virtualization driver 121. The GPU virtualization driver 121 is not a traditional graphics driver that simply communicates with and sends graphics rendering (or other) commands to the APD 116, without understanding aspects of virtualization of the APD 116. Instead, the GPU virtualization driver 121 communicates with the APD 116 to configure various aspects of the APD 116 for virtualization. In one example, the GPU virtualization driver 121 manages parameters related to the time-slicing mechanism for sharing the APD 116 among the different VMs, controlling parameters such as how much time is in each time-slice, how switching is performed between different virtual functions, and other aspects. Note, the GPU virtualization driver 121 may also issue traditional graphics rendering commands to the APD 116 or may perform other tasks not directly related to configuration of the APD 116. The management applications 123 perform one or more tasks for managing virtualization and/or that involve data from two or more different guest VMs 204. In one example, the host VM 202 performs a desktop compositing function through a management application 123, where the desktop compositing function has access to rendered frames from the different guest VMs 204 and composites those frames into a single output view.

The guest VMs 204 include an operating system 120, a GPU driver 122, and applications 126. The operating system 120 is any type of operating system that could execute on processor 102. The GPU driver 122 is a "native" driver for the APD 116 in that the GPU driver 122 controls operation of the APD 116 for the guest VM 204 on which the GPU driver 122 is running, sending tasks such as graphics rendering tasks or other work to the APD 116 for processing. The native driver may be an unmodified or slightly modified version of a device driver for a GPU that would exist in a bare-bones non-virtualized computing system.

Although the GPU virtualization driver 121 is described as being included within the host VM 202, in other implementations, the GPU virtualization driver 121 is included in the hypervisor instead 206. In such implementations, the host VM 202 may not exist and functionality of the host VM 202 may be performed by the hypervisor 206.

The operating systems 120 of the host VM 202 and the guest VMs 204 perform standard functionality for operating systems in a virtualized environment, such as communicating with hardware, managing resources and a file system, managing virtual memory, managing a network stack, and many other functions. The GPU driver 122 controls operation of the APD 116 for any particular guest VM 204 by, for example, providing an application programming interface ("API") to software (e.g., applications 126) to access various functionality of the APD 116. The driver 122 also includes a just-in-time compiler that compiles programs for execution by processing components (such as the SIMD units 138 discussed in further detail below) of the APD 116. For any particular guest VM 204, the GPU driver 122 controls functionality on the APD 116 related to that guest VM 204, and not for other VMs.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102. A command processor 213 accepts commands from the processor 102 (or another source), and delegates tasks associated with those commands to the various elements of the APD 116 such as the graphics processing pipeline 134 and the compute units 132. The VMs inform the APD 116 regarding new tasks for execution via a doorbell mechanism, using the doorbell memory 214.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Notifications that new work is ready to be performed on the APD 116 are made via a doorbell mechanism. More specifically, to notify the APD 116 that new work is ready, an entity (such as the processor 102) writes a doorbell into the doorbell memory 214. The doorbell includes a pointer into a command buffer that indicates the memory address of commands to be fetched and processed.

In one implementation, the doorbell includes the address of the head of a circular buffer. The address of the tail is maintained separately by the APD 116. When the head and tail pointers are equal, no new commands are available to be fetched. When an entity writes a doorbell including a head that is greater than the tail pointer, the commands to be fetched are found at addresses between the head and the tail. The APD 116 consumes the commands in the command buffer, adjusting the tail pointer as commands are fetched. When the head and tail pointers are again equal, no new commands are available in the command buffer. In this implementation, the doorbell serves both as a notification that work is ready to be performed and as an indication of the memory address at which commands are to be found. Optionally, doorbells written into the doorbell memory 214 are marked as processed when work indicated by that doorbell is complete or when a newer doorbell is written into the doorbell memory 214. In other implementations, the doorbell may serve only as an indication that work is ready to be fetched and executed, with indications of the locations of that work being determined separately from the value provided by the doorbell. In yet other implementations, the doorbell may serve any alternative or additional purpose.

The doorbell mechanism operates asynchronously with respect to which virtual machine is currently scheduled for work on the APD 116. This means that a particular virtual machine may place a doorbell in doorbell memory 214 at a time when tasks for a VM other than the VM that placed the doorbell in the doorbell memory 214 are being executed on the APD 116. This asynchronous operation occurs because doorbells are run by software executing on the processor 102 (e.g., software executing on the VMs), which software is scheduled independently as compared with the time-sliced work on the APD 116.

As described above, the virtualization scheduler 212 manages time-sharing of the APD 116 among the different virtual machines. In each time-slice, the virtualization scheduler 212 permits work for the virtual machine associated with that time-slice to proceed in the APD 116. The virtualization scheduler 212 manages time-slices on the APD 116 for the VMs (both the host VM 202 and the guest VMs 204) that share the APD 116. The virtualization scheduler 212 tracks the time-slices, stopping work on the APD 116 when a time-slice for a particular VM has expired and starting work for the VM having the next-time slice. Thus, the virtualization scheduler 212 switches between different VMs that have work to be executed on the APD 116. The act of switching between different VMs is referred to as a "virtualization context switch" herein. The virtualization scheduler selects different VMs to perform work based on a scheduling scheme. In one example, the scheduling scheme is a round robin scheme. In such a scheme, each VM is given a turn on the APD 116, with the order in which the VMs are given turns being repeated. Other technically feasible scheduling schemes are of course possible as well.

To begin work for a particular time-slice associated with a particular VM, the virtualization scheduler 212 causes the command processor 213 to fetch commands for the graphics processing pipeline 134 and/or for general purpose computing work from the address specified by the doorbell memory 214 for the particular VM. The command processor 213 then causes the APD 116 to execute those commands. The commands that are fetched are pointed to by doorbells stored in the doorbell memory 214.

When the virtualization scheduler 212 determines that the time-slice for the VM having work currently executing on the APD 116 has expired, the virtualization scheduler 212 causes the APD 116 to complete that work without accepting any new work (e.g., does not accept new tasks pointed to by a doorbell stored in the doorbell memory 214 but completes the tasks already "in flight" in the graphics processing pipeline 134 and/or compute units 138). Completing the work involves allowing the work currently in-flight in the APD 116 to complete and to have final output values written out to the target memory location. For example, for graphics rendering, output pixels would be written to the frame buffer (or other render target). Alternatively or in some situations, instead of completing tasks, state for the in-progress tasks may be saved and restored again when the function/VM again gets a "turn" on the APD 116.

After work has completed for a particular VM, the virtualization scheduler 212 moves on to the time-slice for the next VM, causing the command processor 213 to fetch tasks for that VM based on the contents of the doorbell memory 214, and to execute those tasks on the graphics processing pipeline 134 and/or in the compute units 132 directly (e.g., for general purpose computing). This process of stopping execution of work for a time slice that has expired and starting work for the next VM is performed repeatedly, in order to provide time-sharing of the APD 116 to the different VMs.

In addition to stopping work for one VM and starting work for another VM, a virtualization context switch also involves saving state for the VM that is being switched away from and loading state for the VM that is being switched to. Generally, state includes values stored throughout or for the APD 116 that manage aspects of the workflow executed for the APD 116. In various examples, state may include values stored in registers that control how graphics is rendered, how SIMD work is executed, how shaders are executed, and control various other aspects of operations on the APD 116. Saving state involves writing the state from an in-use location (where the state values actually have effect on the operation of the APD 116) to a save state location for the VM. Loading state involves loading the state from the save state location for the VM to the in-use location. In some implementations, the save state location is in memory (such as a general purpose memory on the APD 116) and the in-use location includes various memory elements such as registers, special-purpose memory, and the like, within the APD 116.

Note that the other portions of the APD 116 whose functionality is not specifically described in the context of virtualization works as described above and as if no virtualization were occurring to execute the commands fetched by the command processor 213. For example, the graphics processing pipeline 134 performs operations related to graphics rendering in response to graphics rendering commands fetched by the command processor 213. For at least some of the graphics rendering commands associated with the graphics processing pipeline 134, and/or for the general purpose compute operation, SIMD scheduler 136 generates and manages wavefronts for execution on the SIMD units 138 of the compute units 132 in accordance with the commands processed by the command processor 213. In an example a command is a command to render a particular piece of geometry using, among other facilities of the graphics processing pipeline 134, a particular pixel shader program. The graphics processing pipeline 134 processes the geometry through the various stages of the graphics processing pipeline 134, such as the input assembler stage 302, hull shader stage 306, tessellator stage 308, and so on, and at the pixel shader stage 316, causes the geometry to be processed with a specific pixel shader, on the SIMD units 138. The SIMD scheduler 136, manages and schedules the wavefronts for the pixel shader for execution.

Figure 3:
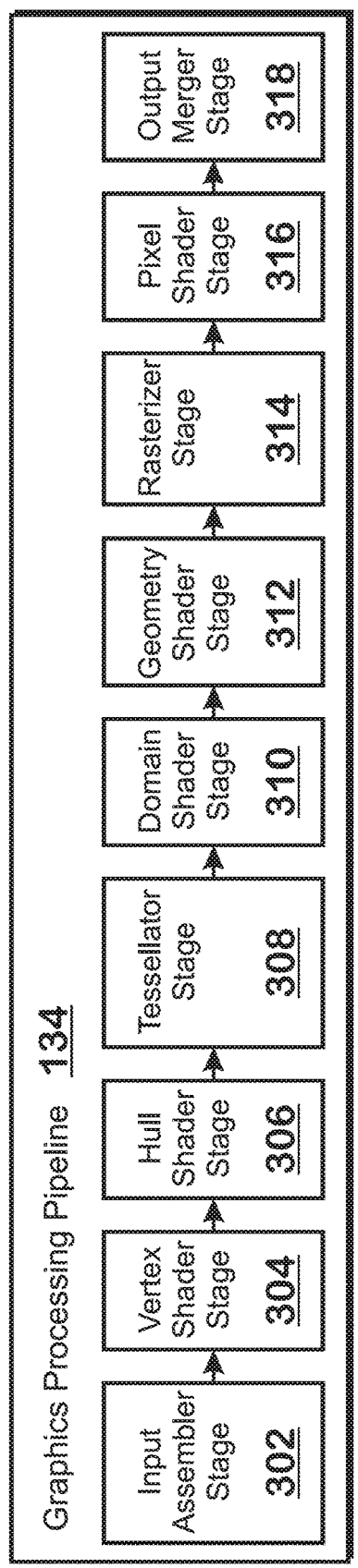
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. In some instances, a shader program that executes on the compute units 132 perform operations for the geometry shader stage 312.

The rasterizer stage 314 accepts and rasterizes simple primitives and generated upstream. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the compute units 132.

The output merger stage 318 accepts output from the pixel shader stage 316 and merges those outputs, performing operations such as z-testing and alpha blending to determine the final color for a screen pixel.

Referring back to FIG. 2, in some instances, a current function finishes work before the amount of time allotted for the time-slice for that function expires and becomes "idle." In some situations in this scenario, the virtualization scheduler 212 performs a virtualization context switch "early." More specifically, after learning of the idleness and before the time-slice is over, the virtualization scheduler 212 causes a virtualization context switch away from the current function and to a next function. The purpose of performing the virtualization context switch early is to allow other functions to perform work when the current function has no more work to perform. Instead of idling the APD 116 for the remainder of the time-slice for the current function, by performing a virtualization context switch to a subsequent function, the resources of the APD 116 are used to perform useful work instead of being idle. In addition to performing the virtualization context switch early upon learning that the current function is idle, the virtualization scheduler 212 is also capable of skipping the next turn of the subsequent if that function was has not received any work since the early virtualization context switch was performed. Whether a function has received work is determined via the doorbell mechanism described throughout this disclosure.

Figure 4:
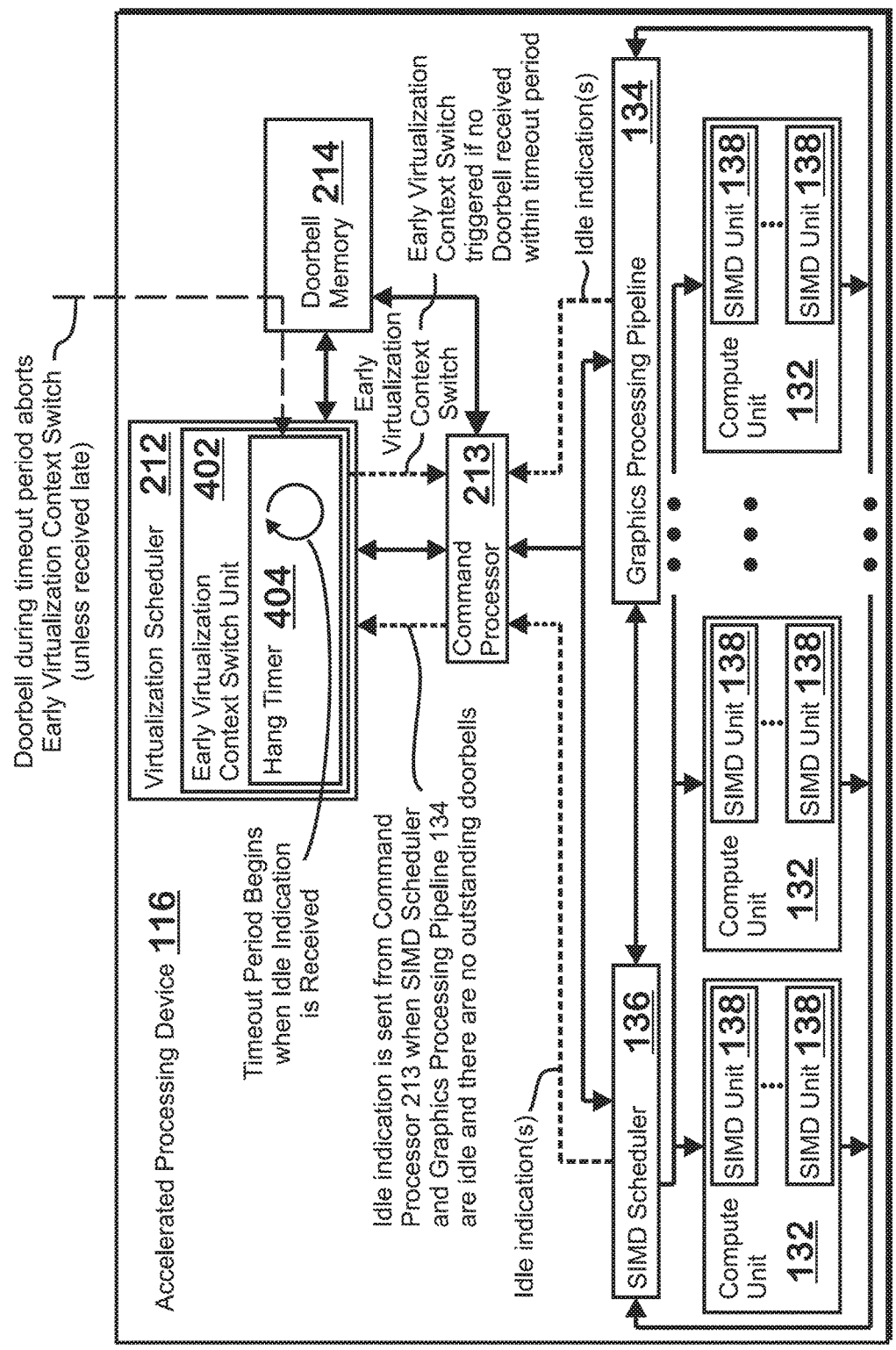
FIG. 4 is a block diagram illustrating features of the device of FIG. 1 related to performing an early virtualization context switch, according to an example.
Figure 5:
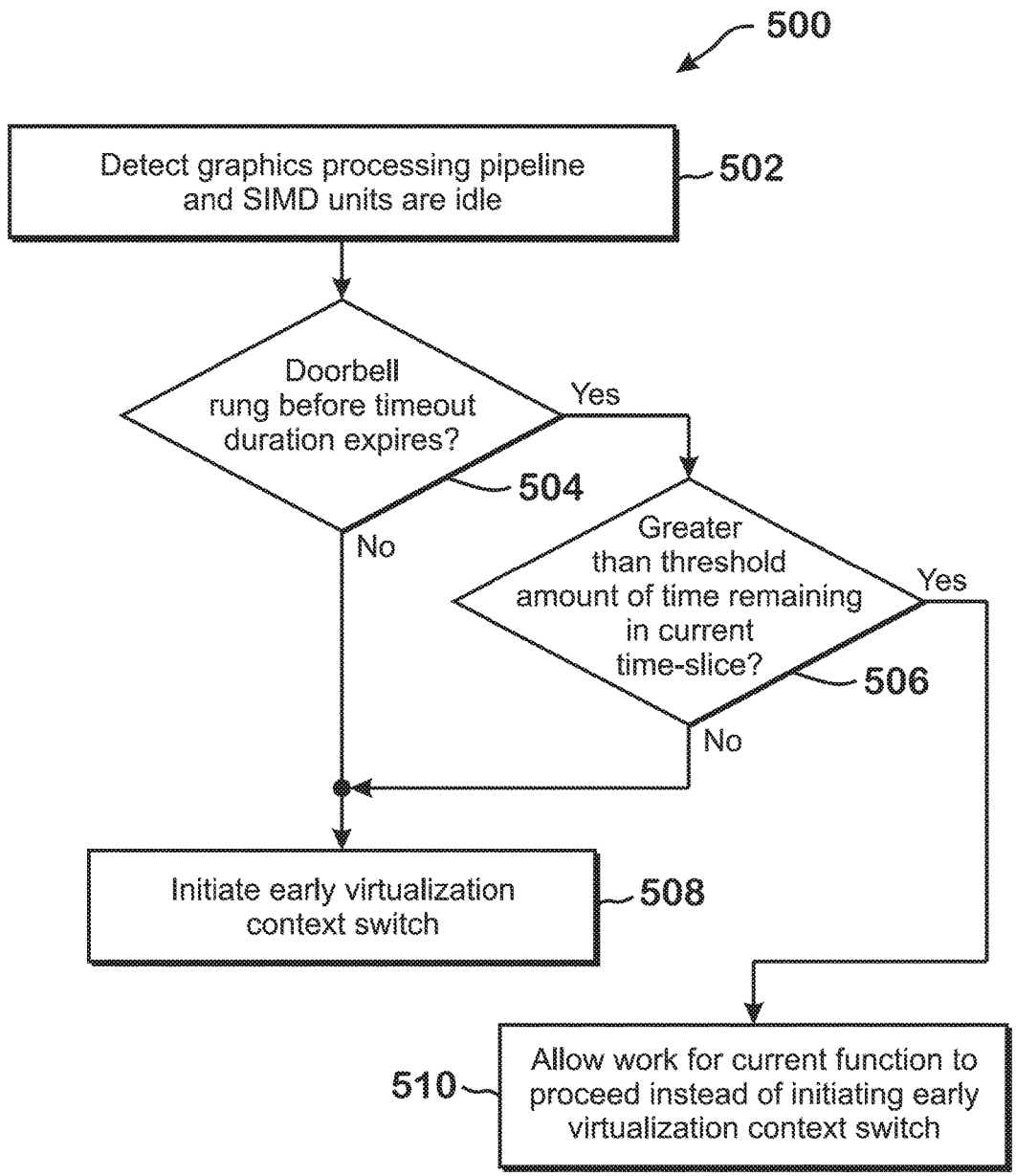
FIG. 5 is a flow diagram of a method for performing an early virtualization context switch, according to an example.

FIG. 4 is a block diagram illustrating features of the device 100 related to performing an early virtualization context switch, according to an example. Many of the elements of the device 100 are illustrated in FIG. 4, which also illustrates an early virtualization context switch unit 402, illustrated as being included within the virtualization scheduler 212. The early virtualization context switch unit 402 may be implemented in hardware, software, or with any combination thereof. Also, note that although the early virtualization context switch unit 402 is illustrated within the virtualization scheduler 212, the present disclosure is not meant to be taken as limiting the physical placement of the components that perform the functionality of the early virtualization context switch unit 402. FIG. 5 is a flow diagram of a method for performing an early virtualization context switch, according to an example. Although the operations of FIG. 5 are described with respect to the system of FIGS. 1-4, it should be understood the method 500, performed by any system, with steps as illustrated or in any other technically feasible order, falls within the scope of the present disclosure. FIGS. 4 and 5 are discussed together below.

The early virtualization context switch unit 402 communicates and coordinates with the command processor 213 to determine when it is appropriate to perform an "early virtualization context switch," based on the state of the graphics processing pipeline 134, or, for compute-only work, the state of the SIMD scheduler 136 and compute units 134. The state of the graphics pipeline 134 includes state of the SIMD scheduler 136 in at least some instances, but if non-graphics compute work is outstanding, then the determination of whether to perform an early virtualization context switch relies on the state of the SIMD scheduler 136 and compute units 134 alternatively or in addition to the state of the graphics processing pipeline 134.

The command processor 213 is the entity that receives requests to perform work on the APD 116 and that dispatches work to the graphics processing pipeline 134 and/or SIMD scheduler 136. More broadly, the command processor 213 controls workflow at a high level on the graphics processing pipeline 134 and SIMD scheduler 136. As part of this workflow control, the command processor 213 receives reports of work completion from various sub-units of the graphics processing pipeline 134 and SIMD scheduler 136. More specifically, for outstanding work on the graphics processing pipeline 134 or the SIMD scheduler 136, the command processor 213 receives notifications when such work is complete. Additionally, the command processor 213 tracks what work is outstanding in the graphics processing pipeline 134 and SIMD scheduler 136. By correlating reports of completion of work with tracking of outstanding work, the command processor 213 tracks information that indicates whether the graphics processing pipeline 134 and SIMD scheduler 136 are idle or are performing work. The SIMD scheduler 136 is considered to be idle if there is no outstanding work on the compute units 132. Thus, due to the role of the SIMD scheduler 136 as the coordinator of functions in the compute units 132, in the phrase "the SIMD scheduler 136 is idle," the SIMD scheduler 136 acts as a proxy for the compute units 132. In one example, if all outstanding work is complete on the graphics processing pipeline 134 and the SIMD scheduler 136, then the command processor 213 considers the graphics processing pipeline 134 and SIMD scheduler 136 to be idle.

Even when the graphics processing pipeline 134 and SIMD scheduler 136 may be idle, there may be work for the command processor 213 to process. For example, the graphics processing pipeline 134 and SIMD scheduler 136 may become idle when the command processor 213 detects that there is a new doorbell to process. Thus, the APD 116 is not considered to be completely idle until the graphics processing pipeline 134 and SIMD scheduler 136 are idle and there are no doorbells waiting to be processed or currently being processed. When the command processor 213 detects that such a state occurs, the command processor 213 is deemed to have made an "idle determination," represented as step 502 in FIG. 5.

Upon making the "idle determination," the command processor 213 provides an indication of this idle determination to the virtualization scheduler 212. Upon receiving this notification, the virtualization scheduler 212 initiates an early virtualization context switch determination sequence. The early virtualization context switch determination sequence performs several functions to determine whether an early virtualization context switch (a virtualization context switch before the time allotted for the time-slice for the current function) should occur, and then to perform the early virtualization context switch if the early virtualization context switch should occur.

In one implementation, the early virtualization context switch determination includes waiting for a timeout period after receiving the idle indication from the command processor 213 and determining whether a doorbell is received within that timeout period (this determination is illustrated as step 504 in FIG. 5). If no doorbells for the current function have arrived at the APD 116 during that timeout period, then the virtualization scheduler initiates an early virtualization context switch (step 508). The early virtualization context switch is performed substantially as a "normal" virtualization context switch, described elsewhere in this disclosure, including saving state for the current function, loading state for the next function, and causing work for the next function to begin being performed.

Initiating the early virtualization context switch also includes transmitting a command to the command processor 213 to stop fetching work based on doorbells in the doorbell memory 214 received after the timeout period has ended. There is a small delay between the time that the virtualization scheduler 212 makes the determination that no doorbells have been received within the timeout period and transmits the command to the command processor 213 to stop fetching the work and the time that the command processor 213 receives the command to stop fetching work. If a doorbell is received during this delay period, the command processor 213 ignores the doorbell, or, if the command processor 213 has begun fetching work based on the doorbell, aborts such fetching. This abort would include resetting state associated with the command processor 213 to the state before the command processor 213 begun processing such doorbell. For example, if the pointers (e.g., a tail pointer) into the command buffer pointed to by the doorbell are updated to process the doorbell, then the command processor 213 resets such pointers to the values prior to processing the doorbell.

Referring back to step 504, if a doorbell is received by the APD 116 during the timeout period, then the method 500 proceeds to step 506. At step 506, the virtualization scheduler 212 determines whether there is a "significant" amount of time left in the time-slice for the current function. A "significant" amount of time is an amount of time above a threshold. In an implementation, the threshold is equal to (or approximately equal to) the delay period during which the command processor 213 determines whether a doorbell is received after the APD 116 has gone idle. If there is greater than a threshold delay period amount of time left in the current time-slice, then the method 500 proceeds to step 510, where the virtualization scheduler 212 does not cause an early virtualization context switch to occur but instead allows the APD 116 to process the work referenced by the doorbell. Referring back to step 506, if there is not an amount of time left in the current time-slice that is greater than the threshold, then the method 500 proceeds to step 508, where the virtualization scheduler 212 performs an early virtualization context switch.

After performing a virtualization context switch for a function, if it becomes the turn for a function again but no doorbells have been received, then the virtualization scheduler 212 skips that function, scheduling work for a different function (such as the "next" function in a scheduling scheme) instead.

In the above discussion, the word "early" in the term "early virtualization context switch" is meant to indicate that a virtualization context switch occurs before the amount of time allotted to the current function has expired.

It should be understood that many variations are possible based on the disclosure herein. For example, although PCIe has been described herein as a particular interconnect fabric, any other technically feasible interconnect fabric may be alternatively used. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing an early virtualization context switch in a virtualized accelerated processing device ("APD"), the method comprising:
   determining, prior to completion of a time-slice for a current function associated with performing work for a virtual machine on the virtualized APD, that the APD is idle;
   responsive to the determining, performing an early virtualization context switch to a subsequent function, the early virtualization context switch including:
   saving state on the APD for the current function;
   loading state for the subsequent function on the APD; and
   starting work for the subsequent function on the APD.

2. The method of claim 1, wherein starting work for the subsequent function comprises:
   fetching commands based on doorbells for the subsequent function; and
   executing the commands for the subsequent function.

3. The method of claim 1, wherein determining that the APD is idle comprises:
   determining that there is no outstanding work for a graphics processing pipeline of the APD and that there is no outstanding work for compute units of the APD.

4. The method of claim 3, wherein determining that the APD is idle further comprises:
   determining that, while there is no outstanding work for a graphics processing pipeline of the APD and that there is no outstanding work for compute units of the APD, no doorbells are being processed or received.

5. The method of claim 1, wherein:
   determining that the APD is idle further comprises determining that no doorbells are received during a timeout period after the APD becomes idle.

6. The method of claim 1, further comprising:
   in response to a second time-slice for a second function completing without the APD being idle longer than a timeout period, permitting the second time-slice to complete for the second function without performing an early virtualization context switch.

7. The method of claim 1, further comprising:
   determining that the APD becomes idle during a second time-slice for a second function;
   determining that a doorbell is received during a timeout period after the APD becomes idle during the second time-slice for the second function; and
   performing work associated with the doorbell instead of performing an early virtualization context switch.

8. The method of claim 1, further comprising:
   determining that the APD becomes idle during a second time-slice for a second function;
   receiving a doorbell during a timeout period after the APD becomes idle during the second time-slice for the second function; and
   responsive to determining that less than a threshold amount of time remains in the second time-slice, performing an early-virtualization context switch despite receiving the doorbell.

9. The method of claim 1, further comprising:
determining, after performing the virtualization context switch, that the virtual machine is to be again given a turn on the APD, based on a scheduling scheme; and
responsive to determining that no doorbells for the virtual machine have been received since performing the virtualization context switch, skipping the turn for the virtual machine.

10. An accelerated processing device ("APD") capable of performing an early virtualization context switch, the APD including one or more parallel processing units, the APD comprising:
a plurality of compute units and a graphics processing pipeline, both configured to perform work, the plurality of compute units comprising one or more parallel processing units;
a command processor comprising a first processor configured to issue commands associated with the work to the plurality of compute units and the graphics processing pipeline; and
a virtualization scheduler comprising a second processor configured to:
determine, prior to completion of a time-slice for a current function associated with performing work for a virtual machine on the APD, that the APD is idle;
responsive to the determining, perform an early virtualization context switch to a subsequent function, the early virtualization context switch including:
saving state on the APD for the current function;
loading state for the subsequent function on the APD; and
starting work for the subsequent function on the APD.

11. The APD of claim 10, wherein the virtualization scheduler is configured to start work for the subsequent function by:
fetching commands based on doorbells for the subsequent function; and
executing the commands for the subsequent function.

12. The APD of claim 10, wherein the virtualization scheduler is configured to determine that the APD is idle by:
determining that there is no outstanding work for a graphics processing pipeline of the APD and that there is no outstanding work for compute units of the APD.

13. The APD of claim 12, wherein the virtualization scheduler is further configured to determine that the APD is idle by:
determining that, while there is no outstanding work for a graphics processing pipeline of the APD and that there is no outstanding work for compute units of the APD, no doorbells are being processed or received.

14. The APD of claim 10, wherein the virtualization scheduler is configured to determine that the APD is idle by:
determining that the APD is idle further comprises determining that no doorbells are received during a timeout period after the APD becomes idle.

15. The APD of claim 10, wherein the virtualization scheduler is further configured to:
in response to a second time-slice for a second function completing without the APD being idle longer than a timeout period, permit the second time-slice to complete for the second function without performing an early virtualization context switch.

16. The APD of claim 10, wherein the virtualization scheduler is further configured to:
determine that the APD becomes idle during a second time-slice for a second function;
determine that a doorbell is received during a timeout period after the APD becomes idle during the second time-slice for the second function; and
cause the APD to perform work associated with the doorbell instead of performing an early virtualization context switch.

17. The APD of claim 10, wherein the virtualization scheduler is further configured to:
determine that the APD becomes idle during a second time-slice for a second function;
detect a doorbell during a timeout period after the APD becomes idle during the second time-slice for the second function; and
responsive to determining that less than a threshold amount of time remains in the second time-slice, perform an early-virtualization context switch despite receiving the doorbell.

18. The APD of claim 10, wherein the virtualization scheduler is further configured to:
determine, after performing the virtualization context switch, that the virtual machine is to be again given a turn on the APD, based on a scheduling scheme; and
responsive to determining that no doorbells for the virtual machine have been received since performing the virtualization context switch, skipping the turn for the virtual machine.

19. A device, comprising:
a processor configured to execute a plurality of virtual machines; and
an accelerated processing device ("APD") capable of performing an early virtualization context switch, the APD one or more parallel processing units, the APD comprising:
a plurality of compute units and a graphics processing pipeline, both configured to perform work at the request of the plurality of virtual machines, the plurality of compute units comprising one or more parallel processing units;
a command processor comprising a first processor configured to issue commands associated with the work to the plurality of compute units and the graphics processing pipeline; and
a virtualization scheduler comprising a second processor configured to:
determine, prior to completion of a time-slice for a current function associated with performing work for a virtual machine on the APD, that the APD is idle;
responsive to the determining, perform an early virtualization context switch to a subsequent function, the early virtualization context switch including:
saving state on the APD for the current function;
loading state for the subsequent function on the APD; and
starting work for the subsequent function on the APD.

20. The device of claim 19, wherein the virtualization scheduler is configured to start work for the subsequent function by:
fetching commands based on doorbells for the subsequent function; and
executing the commands for the subsequent function.

* * * * *